T. H. HUMPHREYS.
WHEEL GARDEN HOE.
APPLICATION FILED MAY 25, 1908.
968,477.
Patented Aug. 23, 1910.
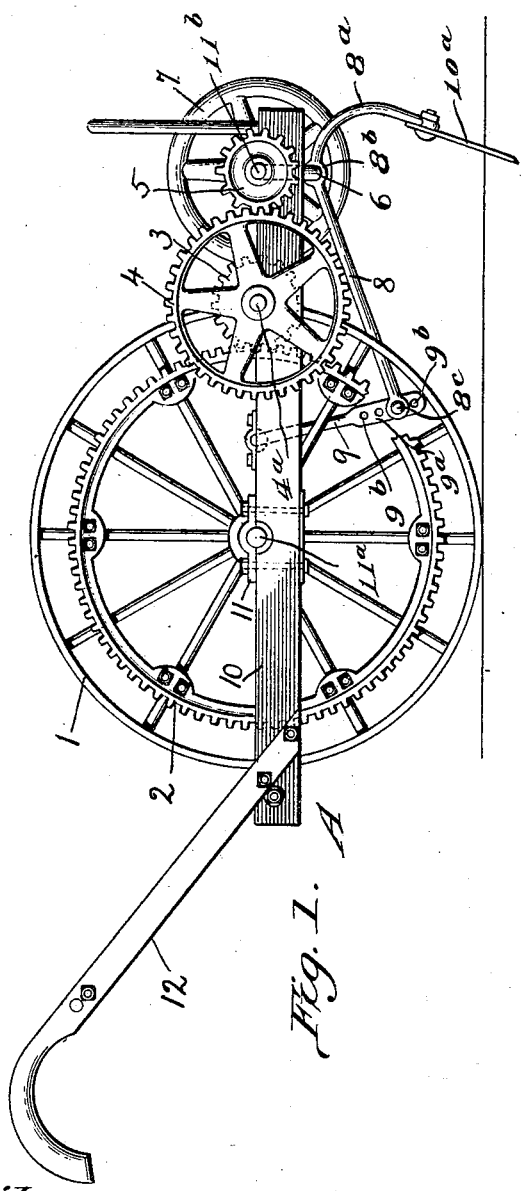
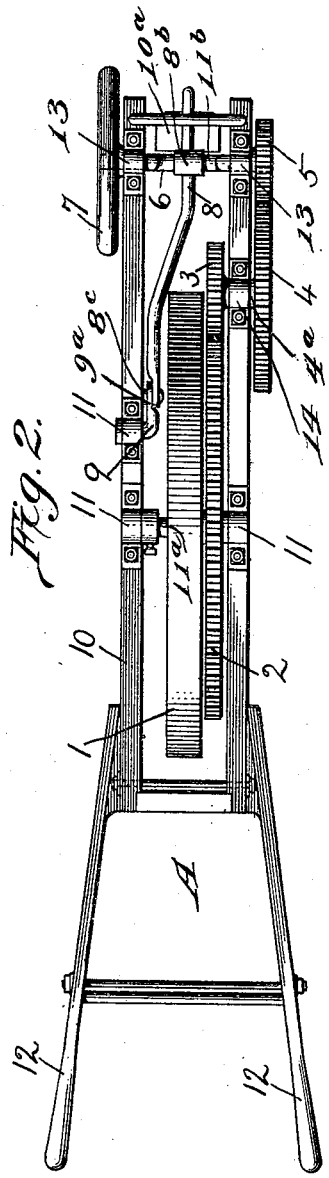
Witnesses:
Inventor,
Thomas Hagen Humphreys

UNITED STATES PATENT OFFICE.

THOMAS HAZEN HUMPHREYS, OF KISSEE MILLS, MISSOURI.

WHEEL GARDEN-HOE.

968,477.  Specification of Letters Patent.  Patented Aug. 23, 1910.

Application filed May 25, 1908. Serial No. 434,969.

*To all whom it may concern:*

Be it known that I, THOMAS HAZEN HUMPHREYS, a citizen of the United States, residing at Kissee Mills, in the county of Taney and State of Missouri, have invented a new and useful Wheel Garden-Hoe, of which the following is a specification.

This invention relates to machines for use in garden cultivation, and has for an object to provide a hoe adapted to be mechanically operated upon movement of the machine, and to provide a driven crank shaft geared with elements of the machine so that a continuous rotary motion is imparted to said crank shaft in order that sufficient power can be transmitted to the hoe to provide for its perfect operation.

A further object of my invention is to provide a machine of the above described character that can be put upon the market at a relatively low cost and to construct the machine in a compact manner so that it may be manually propelled through a garden or field with but little exertion on the part of its operator.

Other objects and advantages will be apparent as the nature of the invention is better set forth, and it will be understood that changes within the scope of the claim may be resorted to without departing from the spirit of the invention.

In the drawing, forming a portion of this specification and in which like numerals of reference indicate similar parts in the several views:—Figure 1 is a side view of the machine. Fig. 2 is a top plan view.

Referring now more particularly to the drawing, there is shown a frame A comprising longitudinally disposed parallel spaced beams or bars 10 provided with handles 12 of suitable form so that they can be engaged by the hands of an operator in order that the machine can be manually propelled through a field or garden. The bars or beams 10 are provided with bearing boxes 11 in which is mounted a shaft $11^a$. The shaft $11^a$ has mounted thereon a drive wheel 1 adapted to support the frame, and the said wheel is located or disposed between the said beams or bars 10, and as clearly indicated the drive wheel has secured thereto in any suitable manner a gear wheel 2 which in the present instance is slightly less in diameter than the diameter of the drive wheel, but it will of course be understood that I do not rely particularly upon the exact size of the gear wheel 2, as it is obvious that it may be of any suitable size to produce the desired results.

Adjacent to the front ends of the beams or bars 10, I mount thereon journal boxes 13 which receive a crank shaft $11^b$ provided for a purpose to be hereinafter set forth. An oscillatory arm 9 is mounted upon one of the beams or bars 10 and is provided with a flattened portion $9^a$ in which is formed a plurality of adjusting passages $9^b$. A hoe $10^a$ is carried by the downwardly extending portion $8^a$ of an element 8 and as clearly indicated, said element is provided with a bearing portion $8^b$ engaged with the crank portion 6 of the shaft $11^b$. From the bearing $8^b$, the element 8 is extended rearwardly and it is loosely engaged with the portion $9^a$ of the arm 9 by means of a removable bolt $8^c$ passed through one of the passages $9^b$. By providing the passages $9^b$ and the removable bolt $8^c$, I effectively provide simple and novel means for adjusting the stroke of the hoe-carrying element 8. The crank shaft has secured thereto outwardly of one of the beams or bars 10, a pinion 5 in mesh with a gear wheel 4 mounted upon a stub axle $4^a$ which latter is journaled in a bearing upon one of the beams or bars 10. The shaft $4^a$ carries a pinion 3 in mesh with the gear 2 so that when the machine is in operation, power supplied to the shaft $4^a$ will be transmitted to the crank shaft $11^b$ to consequently impart to the element 8 an oscillatory movement as will be readily appreciated. The shaft $4^a$ is journaled in a suitable bearing box 14 upon the frame A. In order to provide a more perfect operation of the shaft $11^b$, I mount thereon a fly wheel 7.

The construction of the machine as herein set forth and described is simple, its parts being arranged in a compact manner, and the construction is such that the machine may be manually propelled through a garden or field. Upon movement of the machine in a forward direction, power will be transmitted from the main drive wheel to the crank shaft to consequently impart to the hoe-carrying element an oscillatory movement.

I claim:—

A machine of the class described comprising a wheeled frame, a driving gear secured to the wheel of the frame, a stub shaft journaled on the frame and provided with a gear which meshes with the driving gear on the wheel of the frame, an oscillatory arm mounted on the frame and provided with a plurality of adjusting openings, a crank shaft journaled on the frame, a hoe supported by the crank shaft and provided with a rearwardly extending portion adjustably connected with the said oscillatory arm, geared connections between the stub shaft and the said crank shaft, and a fly wheel mounted at one end of the said crank shaft.

THOMAS HAZEN HUMPHREYS.

Witnesses:
S. C. KISSEE,
ALLEN JOHNSON.